US010715875B2

(12) United States Patent
Depies et al.

(10) Patent No.: US 10,715,875 B2
(45) Date of Patent: Jul. 14, 2020

(54) INTERACTIVE ALERT FOR A VIEWABLE HIGHLIGHT

(71) Applicant: The DIRECTV Group, Inc., El Segundo, CA (US)

(72) Inventors: Michael Edward Depies, Lawndale, CA (US); Kirkosh Pal Chauhan, Redondo Beach, CA (US); Mathew Goldade, Tiburon, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/442,044

(22) Filed: Feb. 24, 2017

(65) Prior Publication Data
US 2018/0249219 A1    Aug. 30, 2018

(51) Int. Cl.
*H04N 21/488* (2011.01)
*H04N 21/462* (2011.01)
(Continued)

(52) U.S. Cl.
CPC ..... *H04N 21/4882* (2013.01); *H04N 21/4316* (2013.01); *H04N 21/4333* (2013.01);
(Continued)

(58) Field of Classification Search
CPC ............ H04N 21/8549; H04N 21/814; H04N 21/4882; H04N 21/4316; H04N 21/4333;
(Continued)

(56) References Cited

U.S. PATENT DOCUMENTS 5,699,107 A    12/1997  Lawler et al.
7,383,563 B1    6/2008  Rashkovskiy
(Continued)

FOREIGN PATENT DOCUMENTS

CN    103281585    9/2013
EP    1381231    1/2004
(Continued)

OTHER PUBLICATIONS

Larsson et al., "A TV Interface for Set-top boxes with Social Functionality," Master's Thesis in Computing Science, UMEA University, Department of Computing Science, Sep. 28, 2010.
(Continued)

*Primary Examiner* — James R Sheleheda
*Assistant Examiner* — Franklin S Andramuno
(74) *Attorney, Agent, or Firm* — Hartman & Citrin LLC

(57) ABSTRACT

A set-top box can provide a program for display to a video device that can be provided to the set-top box using a first signal in a first format, which can be a satellite or cable feed. The set-top box can receive a highlight notification from a content server for a highlight available to be provided for viewing during the program and, in response, can provide an alert associated with the highlight to the video device for display. The set-top box can receive an indication that the alert has been selected and, in response, can access the highlight and provide the highlight to the video device for display. The highlight can be streamed to the set-top box using a second signal in a second format, which can be a video streamed as web content in an Internet video format, and can be removed from display upon completion of the highlight.

20 Claims, 11 Drawing Sheets

(51) Int. Cl.
*H04N 21/472* (2011.01)
*H04N 21/431* (2011.01)
*H04N 21/8549* (2011.01)
*H04N 21/433* (2011.01)
*H04N 21/858* (2011.01)
*H04N 21/81* (2011.01)

(52) U.S. Cl.
CPC ... *H04N 21/4622* (2013.01); *H04N 21/47217* (2013.01); *H04N 21/814* (2013.01); *H04N 21/8549* (2013.01); *H04N 21/8586* (2013.01)

(58) Field of Classification Search
CPC ......... H04N 21/4622; H04N 21/47217; H04N 21/8586
USPC .............................................. 725/38, 41, 42
See application file for complete search history.

(56) References Cited

U.S. PATENT DOCUMENTS

| | | | |
|---|---|---|---|
| 7,636,928 B2* | 12/2009 | Uno | G11B 27/034 348/328 |
| 7,684,681 B1 | 3/2010 | Bodkin et al. | |
| 8,006,268 B2 | 8/2011 | Sloo | |
| 8,156,531 B2 | 4/2012 | Terada et al. | |
| 8,234,676 B2 | 7/2012 | Klein et al. | |
| 8,280,229 B2 | 10/2012 | Wall et al. | |
| 8,291,453 B2 | 10/2012 | Boortz | |
| 8,407,749 B2 | 3/2013 | McLaughlin et al. | |
| 8,578,416 B1* | 11/2013 | Radloff | H04N 5/445 725/41 |
| 8,973,056 B2 | 3/2015 | Ellis et al. | |
| 9,032,296 B1 | 5/2015 | Jeffs et al. | |
| 9,094,723 B2 | 7/2015 | Reams | |
| 9,204,201 B2* | 12/2015 | Beals | H04N 21/6193 |
| 9,294,738 B2 | 3/2016 | Ying et al. | |
| 9,451,302 B2 | 9/2016 | Huang et al. | |
| 9,451,337 B2 | 9/2016 | Chen et al. | |
| 9,479,840 B2 | 10/2016 | Knudson et al. | |
| 2002/0026496 A1 | 2/2002 | Boyer et al. | |
| 2008/0235739 A1 | 9/2008 | Coebergh Van Den Braak | |
| 2008/0263621 A1 | 10/2008 | Austerlitz et al. | |
| 2009/0150927 A1 | 6/2009 | Kouhi et al. | |
| 2011/0200304 A1 | 8/2011 | Rutledge | |
| 2011/0239249 A1 | 9/2011 | Murison et al. | |
| 2011/0292299 A1* | 12/2011 | Lau | G06F 3/0346 348/734 |
| 2012/0131098 A1* | 5/2012 | Wood | G06F 3/0482 709/203 |
| 2014/0099879 A1* | 4/2014 | Birks | H04H 20/24 455/3.06 |
| 2014/0325556 A1* | 10/2014 | Hoang | H04N 21/431 725/32 |
| 2015/0182865 A1* | 7/2015 | Barber | H04N 21/4334 700/91 |
| 2016/0198099 A1* | 7/2016 | Han | H04N 5/4403 348/564 |
| 2018/0020243 A1* | 1/2018 | Ni | H04N 21/2187 |
| 2018/0098114 A1* | 4/2018 | Stevens | H04N 21/2665 |

FOREIGN PATENT DOCUMENTS

| | | |
|---|---|---|
| EP | 1099341 | 10/2004 |
| GB | 2330474 | 4/1999 |
| GB | 2489688 | 10/2012 |
| WO | WO 97/19555 | 5/1997 |
| WO | WO 00/18114 | 3/2000 |

OTHER PUBLICATIONS

Cooper, Mark, "Structured Viral Communications: The Political Economy and Social Organization of Digital Disintermediation," Journal on Telecomm & High Technology Law, vol. 9, Issue 1, Winter 2011, pp. 15-80.

Munkki, Valtteri, "Non-linear Televised Sports—Understanding the Time-shifted User Experience," Master's Thesis, Aalto University, School of Science, Jul. 7, 2014.

Magnusson, Petter A., "Technology Evaluation of future IPTV Services," Master of Science Thesis in the Programme Computer Science and Engineering, Department of Computer Science and Engineering, Chalmers University of Technology, University of Gothenburg, May 2009.

\* cited by examiner

INTERACTIVE ALERT FOR A VIEWABLE HIGHLIGHT

BACKGROUND

Many different broadcast program viewing options are available to viewers on a number of different channels. When people select programs on certain channels to watch, they inevitably miss other programs or portions of other programs provided on other channels while they are watching the programs selected for viewing. In order to get caught up on the programs missed, people typically access recap shows that provide highlights of the missed programs. However, viewing these recap programs can be inconvenient because such recap programs may require changing the channel in order to access the recap programs. Moreover, the recap programs are usually provided at a time significantly after the portion of the program set forth in the highlight has occurred, which means that a viewer could hear about the highlight before being able to view the highlight, causing the highlight to be stale or spoiled.

SUMMARY

The present disclosure is directed to providing alerts to a user viewing a program for highlights occurring in other programs or earlier in the same program being viewed, options for viewing the highlights of the programs during the program being viewed, criteria for determining highlight events for preparing the highlights and providing highlight notifications associated with the highlights. The present disclosure is also directed to providing the highlights to a user while the user is watching a program. As used herein, a "highlight" is used to refer to a video clip or other media clip of a portion of a video program. As used herein, a video "program" is used to refer to a video broadcast, presentation, movie, event or other video presentation, which can include broadcast video programs. A video program being viewed can be provided to a set-top box using a first signal in a first format, such as for example, a satellite feed or cable feed in a broadcast program format. The set-top box can receive a highlight notification for a highlight available for viewing during the video program, and can provide an alert associated with the highlight to the user. The user can choose to access the highlight, and the highlight can be provided to the set-top box and shown while the program is being viewed. The highlight can be provided to the set-top box using a second signal in a second format, such as for example, streamed as web content of a video clip in an Internet video format.

In some embodiments, the concepts and technologies disclosed herein can be used to determine other programs from the program being viewed and to detect major events occurring for those other programs for which a highlight can be made available during the program being viewed. In some other embodiments, the concepts and technologies disclosed herein can be used to provide alerts to the user for viewing a highlight of a major event in another program. Upon user selection of an alert, the highlight can be accessed and provided for display while the program, which is provided to the set-top box using a first signal in a first format, is being viewed. According to embodiments, the highlight is provided to the set-top box using a second signal in a second format. The highlight can be removed from display upon completion of the highlight.

In embodiments of the concepts and technologies disclosed herein, identifying a program and an event of the program to use to generate a highlight for display while another program is being viewed can be based on information from a data feed associated with the program, the other program being viewed, or a combination of the programs. As used herein, a "data feed" refers to information in addition to the video content for a program that accompanies the video content, which can include closed captioning information, program description information, and/or live or near live updates related to the video content such as information for events, features and other aspects for the program. As used herein, a "highlight event" refers to a moment or portion in a program identified for generation of a highlight, which can be a video clip of the highlight event (moment or portion in the program). Highlight events from programs can be determined for generation of a highlight for presentation during another program based on at least a portion of the program meeting or exceeding parameters, which can be set by a content provider and/or a user associated with a set-top box. In some embodiments, a content server sets the parameters for the comparison with the data feed content for another program. In other embodiments, according to concepts and features disclosed herein, set-top box users can provide preferences that the content server can use to set the parameters. As an example, highlight events can be determined for football programs while a user is watching another football program. The highlight events for which highlights are generated can be determined based on information from the data feeds of the football programs meeting or exceeding certain parameters, such as replay events exceeding a duration parameter or scoring events exceeding a point value parameter. Highlights of the highlight events can then be created. When the highlights are available, alerts associated with the highlights can be provided to the user viewing a program, such as the other football game, provided to a video device by the set-top box that receives the program via a first signal in a first format. Upon user selection of an alert, a highlight can be accessed and provided to the video device for display. The highlight can be streamed to the set-top box using a second signal in a second format, and the highlight can be removed from display on the video device upon completion of the highlight.

According to one aspect of the concepts and technologies disclosed herein, a set-top box is disclosed. The set-top box can include a processor and a memory. The memory can store computer-executable instructions that, when executed by the processor, cause the processor to perform operations. The operations can include providing a program for display to a video device connected to the set-top box. The program can be provided to the set-top box using a first signal in a first format. The set-top box can receive a highlight notification from a content server for a highlight available to be provided during the program being provided to the video device. The set-top box can provide an alert associated with the highlight available for viewing to the video device in response to receiving the highlight notification. The set-top box can receive an indication that the alert has been selected, such as by a user. In response to receiving the indication that the alert has been selected, the set-top box can access the highlight and provide the highlight for display to the video device. The highlight can be streamed to the set-top box using a second signal in a second format. The highlight can be removed from display on the video device upon completion of the highlight.

In embodiments of the concepts and technologies disclosed herein, the program in the first format continues to be provided to the set-top box using the first signal while the highlight is streamed to the set-top box using the second signal. The program in the first format provided to the set-top box using the first signal can be recorded while the highlight is streamed to the set-top box using the second signal in the second format. In some embodiments, the program being viewed can be provided to the set-top box as a satellite feed or a cable feed in a broadcast program format. In some embodiments, the highlight can be streamed to the set-top box as web content of the highlight as a video clip in Internet video format.

In some embodiments, the program provided to the video device can be paused while the highlight is provided to the video device. In some embodiments, the highlight can be provided as a full screen display while the program being viewed is paused, and the program can resume being played upon completion of the highlight. In other embodiments, the highlight can be provided along with the program continuing to play, such as a picture-in-picture view of the highlight along with the program being viewed continuing to play in the main screen, or vice-versa with the program being viewed continuing to play as a picture-in-picture view and the highlight being displayed in the main screen.

According to other embodiments of the set-top box, the contents of the highlight notification received from the content server for viewing during the program can be determined by the content server. Further, the content server can determine another program for which the content server can provide a highlight. In addition, the highlight event for the highlight can be identified by the content server. The content server can identify the highlight event by identifying data feed content for the other program. For example, if the program being watched is a football game, the content server can determine other football game programs from which to identify highlight events for generation of highlights to provide to a user while watching the football game program being viewed. In such a scenario, the content server can identify a data feed format for other football programs and the content of the data feeds, which can include data feeds related to the score, time clock, current play, etc., as well as information about instant replays and statistics. The content server can compare program information for other programs, such as other football games, with the data feed content for each of those other programs to determine a highlight event of at least one of the other programs that meets or exceeds parameters associated with the data feed content for consideration when identifying other programs for generation of highlights. For instance, the content server can evaluate data content for another football game to identify scoring parameters appropriate for a highlight event, such as scoring events of six points or greater, which can indicate a touchdown play that can be a highlight event of the other football program.

The content server can further create a viewable highlight for the highlight event and can send a highlight notification of the viewable highlight to the set-top box. In some embodiments, the highlight notification sent to the set-top box can include a program name for the other program from which the highlight was generated, an alert description (e.g., Team X scored a touchdown in playoff game Y), and a highlight description with additional details about the highlight.

According to another aspect, a method is disclosed. The method can include providing, from a set-top box, a program for display to a video device connected to the set-top box. The program can be provided to the set-top box using a first signal in a first format. The method can also include receiving, at the set-top box, from a content server, a highlight notification for a highlight available during the program being provided to the video device. Further, the method can include, in response to receiving the highlight notification, providing, by the set-top box, to the video device, an alert associated with the highlight available for viewing in response to receiving the highlight notification. In addition, the method can include receiving, at the set-top box, an indication that the alert has been selected, such as by a user selecting the alert or an option in the alert to view the highlight. In response to receiving the indication that the alert has been selected, the set-top box can access the highlight, and provide the highlight for display to the video device. The highlight can be streamed to the set-top box using a second signal in a second format. The highlight can be removed from display on the video device upon completion of the highlight.

In embodiments of the concepts and technologies disclosed herein, the program in the first format continues to be provided to the set-top box using the first signal while the highlight is streamed to the set-top box using the second signal. The program in the first format provided to the set-top box using the first signal can be recorded while the highlight is streamed to the set-top box using the second signal in the second format. In some embodiments of the method, the program being viewed can be provided to the set-top box as a satellite feed or a cable feed in a broadcast program format. In some embodiments, the highlight can be streamed to the set-top box as web content of the highlight as a video clip in Internet video format.

According to some embodiments of the concepts and technologies disclosed herein for the method, the program provided to the video device can be paused while the highlight is provided to the video device. In some embodiments, the highlight can be provided as a full screen display while the program being viewed is paused, and the program can resume being played upon completion of the highlight. In other embodiments, the highlight can be provided along with the program continuing to play, such as a picture-in-picture view of the highlight along with the program being viewed continuing to play in the main screen, or vice-versa with the program being viewed continuing to play as a picture-in-picture view and the highlight being displayed in the main screen.

According to other embodiments of the concepts and technologies for the method, the contents of the highlight notification received from the content server for viewing during the program can be determined by the content server. Further, the content server can determine another program for which the content server can provide a highlight. In addition, the highlight event for the highlight can be identified by the content server. The content server can identify the highlight event by evaluating data feed content for the other program to determine a highlight portion of the other program that meets or exceeds parameters for the other program, such as data feed content for NFL football game programs. For instance, the content server can evaluate data content for these games to identify scoring parameters appropriate for a highlight event for generation of a highlight, such as identifying scoring events of six points or greater, which can indicate a touchdown play that can provide a highlight portion of the other football program.

Further, the method can include creating, by the content server, a viewable highlight for the highlight portion and sending the highlight notification for the viewable highlight to the set-top box. In some embodiments, the content server sets the parameters for the comparison with the data feed content for another program. In other embodiments, according to concepts and features disclosed herein, set-top box users can provide preferences that the content server can use to set the parameters. In some embodiments, the highlight notification sent to the set-top box can include a program name for the other program, an alert description, and a highlight description with additional details about the highlight.

According to yet another aspect of the concepts and technologies disclosed herein, a computer storage medium is disclosed. The computer storage medium can store computer-executable instructions that, when executed by a processor, cause the processor to perform operations. The operations can include providing, from a set-top box, a program for display to a video device connected to the set-top box. The program can be provided to the set-top box using a first signal in a first format. The operations can also include receiving, at the set-top box, from a content server, a highlight notification for a highlight available during the program being provided to the video device. Further, the operations can include, in response to receiving the highlight notification, providing, by the set-top box, to the video device, an alert associated with the highlight available for viewing in response to receiving the highlight notification. In addition, the operations can include receiving, at the set-top box, an indication that the alert has been selected, such as by a user selecting the alert or an option in the alert to view the highlight. In response to receiving the indication that the alert has been selected, the set-top box can access the highlight, and provide the highlight for display to the video device. The highlight can be streamed to the set-top box using a second signal in a second format. The highlight can be removed from display on the video device upon completion of the highlight.

In embodiments of the concepts and technologies disclosed herein, the program in the first format continues to be provided to the set-top box using the first signal while the highlight is streamed to the set-top box using the second signal. The program in the first format provided to the set-top box using the first signal can be recorded while the highlight is streamed to the set-top box using the second signal in the second format. In some embodiments of the computer storage medium, the program being viewed can be provided to the set-top box as a satellite feed or a cable feed in a broadcast program format. In some embodiments, the highlight can be streamed to the set-top box as web content of the highlight as a video clip in Internet video format.

According to some embodiments of the concepts and technologies disclosed herein for the computer storage medium, the program provided to the video device can be paused while the highlight is provided to the video device. In some embodiments, the highlight can be provided as a full screen display while the program being viewed is paused, and the program can resume being played upon completion of the highlight. In other embodiments, the highlight can be provided along with the program continuing to play, such as a picture-in-picture view of the highlight along with the program being viewed continuing to play in the main screen, or vice-versa with the program being viewed continuing to play as a picture-in-picture view and the highlight being displayed in the main screen.

According to other embodiments of the concepts and technologies for the computer storage medium, the contents of the highlight notification received from the content server for viewing during the program can be determined by the content server. Further, the content server can determine another program for which it can provide a highlight. In addition, the highlight event for the highlight can be identified by the content server. The content server can identify the highlight event by evaluating date feed content for the another program to determine a highlight portion of the another program that meets or exceeds parameters for its data feed content. Further, the computer storage medium can include creating, by the content server, a viewable highlight for the highlight portion and sending the highlight notification for the highlight to the set-top box. In some embodiments, the content server sets the parameters for the comparison with the data feed content for another program. In other embodiments, according to concepts and features disclosed herein, set-top users can provide preferences that the content server can use to set the parameters. In some embodiments, the highlight notification sent to the set-top box can include a program name for the other program, an alert description, and a highlight description with additional details about the highlight.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
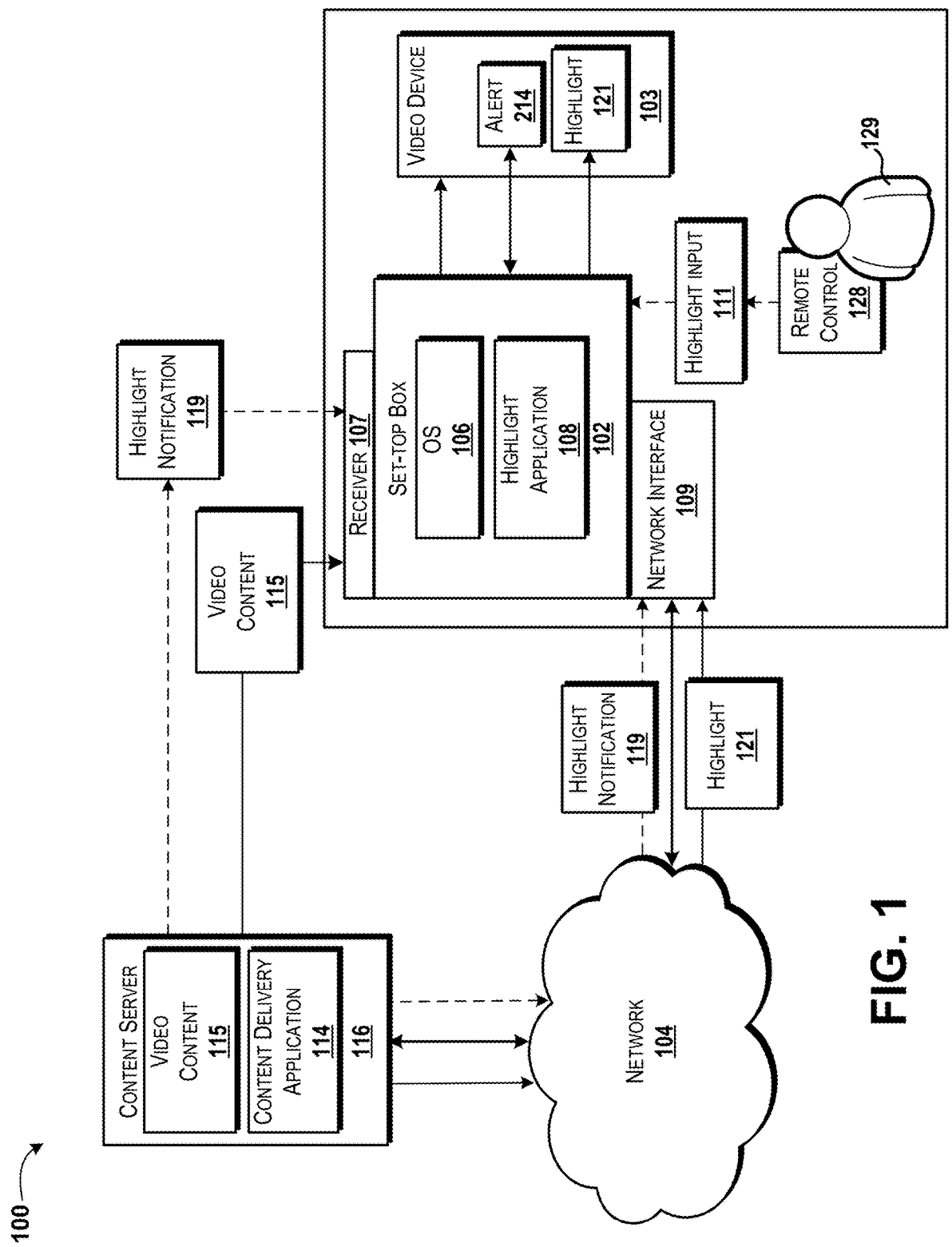
FIG. 1 is a system diagram of an illustrative operating environment for various embodiments of the concepts and technologies described herein.

The following detailed description is directed to concepts and technologies for providing alerts for viewable highlights. In some embodiments, the concepts and technologies disclosed herein can be used to detect major events occurring in programs. According to some embodiments, the major event occurs in a program that is related to a program being viewed by a user of a set-top box. According to other embodiments, the major event occurs in a program that is unrelated to the program being viewed. In yet other embodiments, the major event has occurred earlier in time for the program being viewed. In some other embodiments, the concepts and technologies disclosed herein can be used to provide an alert to a user viewing a program for viewing a highlight of a major event that occurred in another program or earlier in time for the program being viewed. Upon user selection of the alert, a video display associated with the user is switched from the first program to the highlight of the major event that occurred in the other program or earlier in time in the same program to show the highlight, and upon completion of the highlight, playback of the first program automatically resumes. According to further embodiments, the video display associated with the user provides both the program being viewed and the highlight of the major event simultaneously via, for example, a picture-in-picture feature.

In embodiments of the concepts and technologies disclosed herein, parameters for identifying highlight events in a corresponding program can be based on parameters set for data in a data feed for a program, which can be a data feed according to a program type or known format for a program data feed. Highlight events can be determined based on the data feeds of programs, and portions of programs, that meet or exceed the parameters. Viewable highlights can be created based on the parameters. A highlight notification associated with a viewable highlight can be sent to a set-top box or other device, and a highlight can be provided for viewing in response to a selection associated with the highlight notification. For instance, user selection of the highlight notification can switch the display from a first program being viewed to show the highlight. The display can be automatically returned back to video playback of the first program upon completion of the highlight.

The systems and devices illustrated and described herein can include, for example, content delivery systems, set-top boxes ("STBs"), digital video recorders ("DVRs"), or other devices as illustrated and described herein. The present disclosure is directed to providing alerts for viewable highlights in programs.

While the subject matter described herein is presented in the general context of program modules that execute in conjunction with the execution of an operating system and application programs on a set-top box, those skilled in the art will recognize that other implementations may be performed in combination with other types of program modules. Generally, program modules include routines, programs, components, data structures, and other types of structures that perform particular tasks or implement particular abstract data types.

Referring now to FIG. 1, aspects of an operating environment 100 for various embodiments of the concepts and technologies will be described. As shown in FIG. 1, the operating environment 100 can include a computing device configured as a set-top box 102, a network 104, and a content server 116 for providing programs to the set-top box 102 via the network 104 and/or via broadcast communications, such as satellite or cable television communications. It should be understood, however, that various implementations of the operating environment 100 can include one or more than one set-top box 102; one or more than one network 104; and one or more than one content server 116. As such, the illustrated embodiment should be understood as being illustrative, and should not be construed as being limiting in any way.

As set forth in the specification and the claims, the functionality of the set-top box 102 can be provided by one or more set top boxes, set-top units ("STUs") or other customer premises equipment ("CPE"). As set forth in the specification and the claims, the set-top box 102 excludes mobile telephones, smartphones, tablet or slate devices, personal computing devices, or other similar computing devices. One example embodiment of an architecture for the set-top box 102 is illustrated and described in detail below with reference to FIG. 9. In some embodiments, the set-top box 102 can be owned and/or operated by a carrier that can provide television signals of programs including video content 115 and/or other data that are provided to the set-top box 102. The video content 115 can be associated with a program for viewing as discussed hereafter.

The set-top box 102 can include one or more receivers for receiving the television signals including the video content 115 provided by the content server 116 and, optionally, highlight notifications 119, which can also be provided via network communications and/or broadcast communications as discussed herein. The receivers can include a satellite receiver 107 for receiving satellite television signals and information associated with the satellite television signals, a cable receiver for receiving cable television signals and information associated with the cable television signals, and/or a terrestrial receiver for receiving digital broadcast television signals and information associated with the digital broadcast television signals. The receivers provide one-way communication from the content server 116 to the set-top box 102 and do not communicate back to the content server 116. The set-top box 102 can provide the video content 115 received via one of more of the receivers to a video device 103 connected to the set-top box 102 for display by the video device 103.

The set-top box 102 can also include a network interface 109 that allows communication between the set-top box 102 and the network 104. The communication between the set-top box 102 and the network interface 109 can include web content, such as a highlight 121 and, optionally, a highlight notification 119 discussed further herein, in the form of Internet Protocol (IP) data packets routed between the network interface 109 of the set-top box 102 and the network 104. Unlike the receiver 107 of the set-top box 102 described above, the network interface 109 provides two-way communication between the network 104 and the set-top box 102.

The set-top box 102 can execute an operating system 106 and one or more application programs such as, for example, a highlight application 108. The functionality associated with the highlight application 108 can include a standalone application and/or can be a part of other application programs such as a media content player/controller application (not shown) of the set-top box 102, a playback application, or the like. The highlight application 108 can provide alerts 214 to the video device 103 connected to the set-top box 102 regarding highlights 121 available for viewing via the video device 103. The highlight application 108 can further optionally manage playback controls for the highlight 121 as well as user inputs and other communications related to the alerts 214 and playing the highlights 121. Further, as shown in FIG. 1, the highlight application 108 can provide the alerts 214 to the video device 103 in response to the set-top box 102 receiving highlight notifications 119 from the content server 116 regarding highlights 121 available to be provided for viewing. The set-top box 102 can receive the highlights 121 from the network 104 via the network interface 109. According to embodiments, the highlights 121 can be sent by the network 104 to the set-top box 102 as IP data packets of a video file embedded in web content using a standard such as HTML5.

The operating environment 100 also can include one or more server computers such as the content server 116. The functionality of the content server 116 can be provided by various types of hardware and/or software for storing the video content 115, providing the video content 115 to various devices, and/or supporting other communications that may relate to providing video content. In the illustrated embodiment, the content server 116 can also include hardware and software for supporting communications over a geographic area or other portion of a communications network such as the network 104. It should be understood that this example is illustrative and therefore should not be construed as being limiting in any way.

The highlight application 108 can provide an alert 214 (see FIGS. 2, 4A, 4B and 5) including an alert associated with a highlight, such as the highlight 121, from a program available for viewing by a user, such as a user 129, to allow the user 129 to choose whether or not to proceed with viewing the highlight 121. The highlight application 108 can optionally control playback of the highlight 121, which can also be controlled by existing playback controls and related existing functionality of the set-top box 102. In some configurations, the highlight application 108 can be configured to receive one or more highlight inputs 111. The highlight inputs 111 can be received from a remote-control device 128. The highlight inputs 111 can be received, for example, in response to the user 129 interacting with the alert 214, as discussed further below with reference to FIGS. 2, 4A-D and 5. In some arrangements, the remote-control device 128 can include a remote control 350 shown in FIG. 3. The remote control 350 can send user inputs, such as the highlight inputs 111, via infrared signals or other media to a receiver, a set-top box such as the set-top box 102, and/or other devices.

It should be further understood that custom-made or custom-configured remote control devices can be used to provide the functionality of the remote-control device 128 illustrated and described herein. It should be further understood, however, that almost any type of input/output device can be used to provide the functionality of the remote-control device 128 illustrated and described herein and/or can be configured to operate interactively with the highlight application 108. For example, the remote-control device 128 can be designed for use with the set-top box 102 and can be provided by a particular content delivery provider and/or content delivery system, if desired. In such an arrangement, the remote-control device 128 can include one or more buttons that can be configured for use with the highlight application 108. For example, the functionality of the remote-control device 128 can be provided by other devices that can include a module or application.

In one contemplated embodiment, the functionality of the remote-control device 128 can be provided by a mobile device that can communicate with the set-top box 102 in various ways, such as via wireless communications, in order to provide the highlight inputs 111 to the set-top box 102. In another example, the remote-control device 128 can be configured as a sensor or number of sensors that can be in communication with the set-top box 102. The sensor(s) can recognize particular movements, sounds, or motions to indicate entry of a highlight input 111. Because the highlight inputs 111 illustrated and described herein can be received or detected in additional or alternative manners, it should be understood that these examples are illustrative, and therefore should not be construed as being limiting in any way.

As discussed above, the highlight application 108 can be configured to provide alerts to the video device 103 regarding highlights from programs that are available to be provided for viewing by the user 129 if selected for viewing. In one embodiment, according to concepts and technologies discussed herein, the highlight application 108 can optionally be configured to provide a program to the video device 103 for display by the video device 103, which could also be provided by functionality of the set-top box 102. As set forth above, the program can be provided to the set-top box 102 as signals that are received by the receiver 107 of the set-top box 102. The signals can be satellite television signals or cable television signals in a broadcast television program format.

The set-top box 102 can further receive a highlight notification 119 from the content server 116 identifying a highlight 121 that is available for viewing. According to embodiments of the concepts and technologies discussed herein, a highlight notification 119 can be generated by a content delivery application 114 of the content server 116 whenever an event in a program is identified as one for which a highlight 121 should be generated, such as according to the preset parameters for a program as discussed in further detail below. In some embodiments, the highlight notification 119 can be broadcast and received through the receiver 107 along with the video content 115. For example, in scenarios in which the highlight application 108 and related highlight functionality is generally universally available to set-top boxes and related devices receiving video content 115 from the content server 116, then it may be beneficial to include the highlight notification 119 along with, or as part of, the video content 115. In other embodiments, the highlight notification 119 can be received via the network 104 and can be sent as targeted communications to set-top boxes and related devices having the highlight application 108 and related highlight functionality, and/or to such devices that subscribe to a highlight service.

According to embodiments, the highlight 121 can be viewed while a program is being provided to the video device 103 by the set-top box 102. As such, while the viewer is watching the program being provided to the video device 103, the highlight 121 identified in the highlight notification 119 can also be provided to the video device 103 for the user 129 to watch. As discussed further hereafter, the highlight application 108 can provide alerts, receive user indications to select alerts, and provide highlights responsive to selection of the alerts.

As also set forth above, the set-top box 102 can receive a highlight 121 from the network 104 via the network interface 109 of the set-top box 102. According to embodiments, the highlight 121 can be sent by the network 104 to the set-top box 102 as IP data packets of a video file embedded in web content using a standard such as HTML5 Thus, while a user, such as the user 129, is viewing a program received by the receiver 107, such as a satellite receiver or a cable receiver, of the set-top box 102 as satellite television signals or cable television signals, respectively, the user 129 is also able to view a highlight, such as the highlight 121, received from the network 104 via the network interface 109 of the set-top box 102 as IP data packets.

Figure 2:
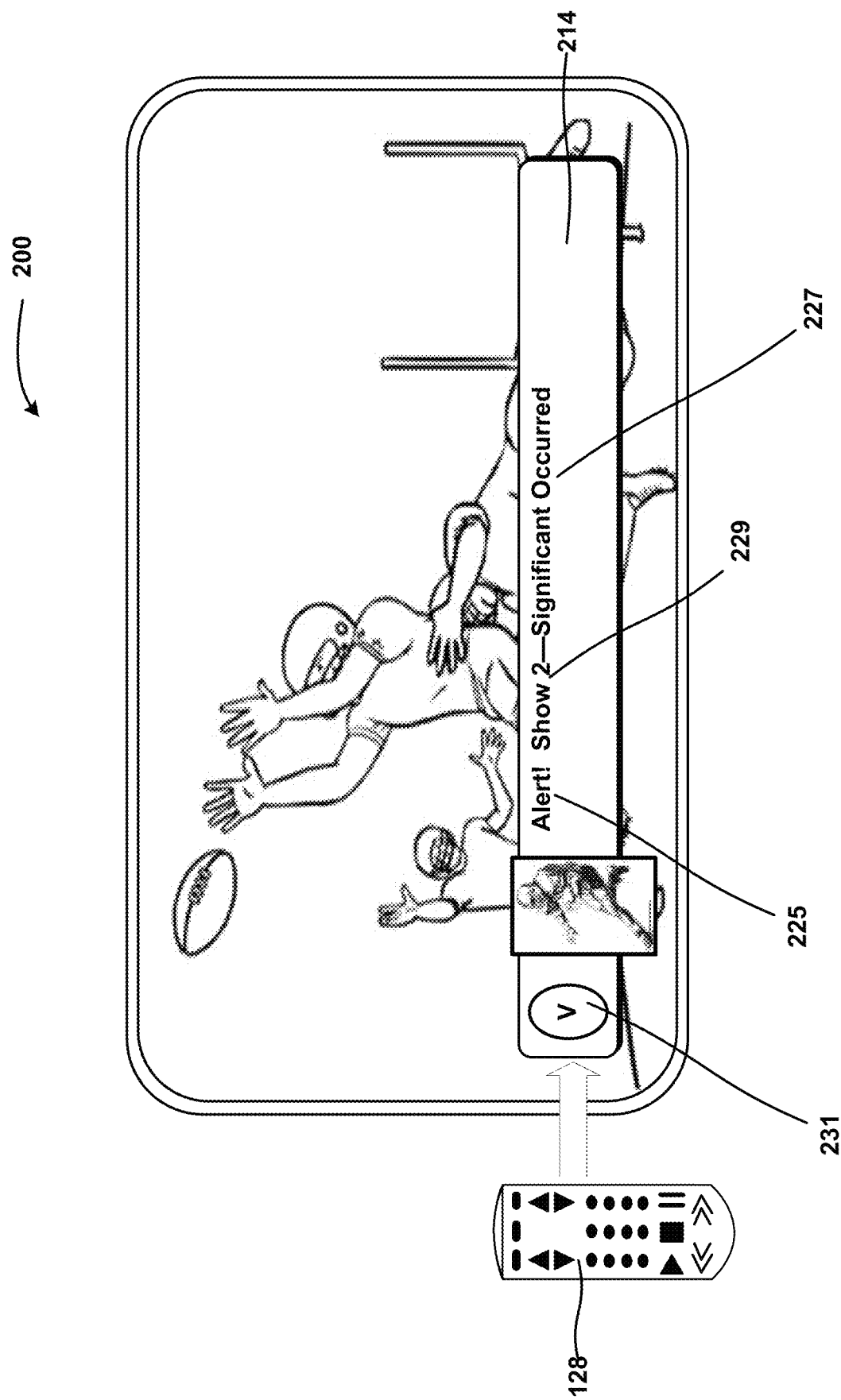
FIG. 2 is an alert diagram showing aspects of providing an interactive alert for a highlight available to be viewed and a selectable input, according to illustrative embodiments of the concepts and technologies described herein.

Referring now to FIG. 2, a display 200 is shown, according to an example embodiment, which is the display 200 shown on the video device 103. In some embodiments, the display 200 including the elements described below can be shown on the video device 103, for example in response to the set-top box 102 detecting a notification, such as the highlight notification 119, for a viewable highlight 121. Because the display 200 can be shown at additional and/or alternative times, it should be understood that this example is illustrative, and therefore should not be construed as being limiting in any way.

In the illustrated embodiment, the video content 115 of a program can be displayed in the display 200 of the video device 103 to allow a user, such as the user 129, to watch the video content 115 of the program. The highlight application 108 of the set-top box 102 can create and provide to the video device 103 an alert 214 for display on a portion of the display 200 while the video content 115 of the program is also being displayed on the display 200. According to embodiments, the alert 214 can include an alert notification 225 that indicates the availability of a highlight from another program or from earlier in the program currently being viewed by the user 129 that is available for viewing via the video device 103. It should be understood that this example is illustrative, and therefore should not be construed as being limiting in any way. In some arrangements, the alert 214 can be provided as a transparent, partially transparent, partially opaque, or opaque overlay, though this is not necessarily the case. If the alert 214 is provided as a partially transparent overlay, portions of the video content 115 underlying the alert 214 can be viewed at the same time as the alert 214. It should be understood that this example is illustrative, and therefore should not be construed as being limiting in any way.

In the example configuration shown in FIG. 2, the alert 214 can also include an alert description 227 as well as a name 229 of the program, which may be another program from the one being displayed via the display 200 or the program being displayed, to which the alert notification 225 corresponds. The alert notification 225 and the alert description 227 can notify the user 129 about the highlight event that occurred in the program. The alert 214 can provide the user 129 with an option 231 to view a highlight of the highlight event that occurred such that if the option 231 is selected, via a highlight input 111 received from the remote-control device 128, the highlight of the highlight event is responsively displayed on at least a portion of the display 200. Alternatively, the alert 214 may itself be the option to view the highlight such that if the alert 214 is selected, the highlight is responsively displayed on at least a portion of the display 200.

Figure 3:
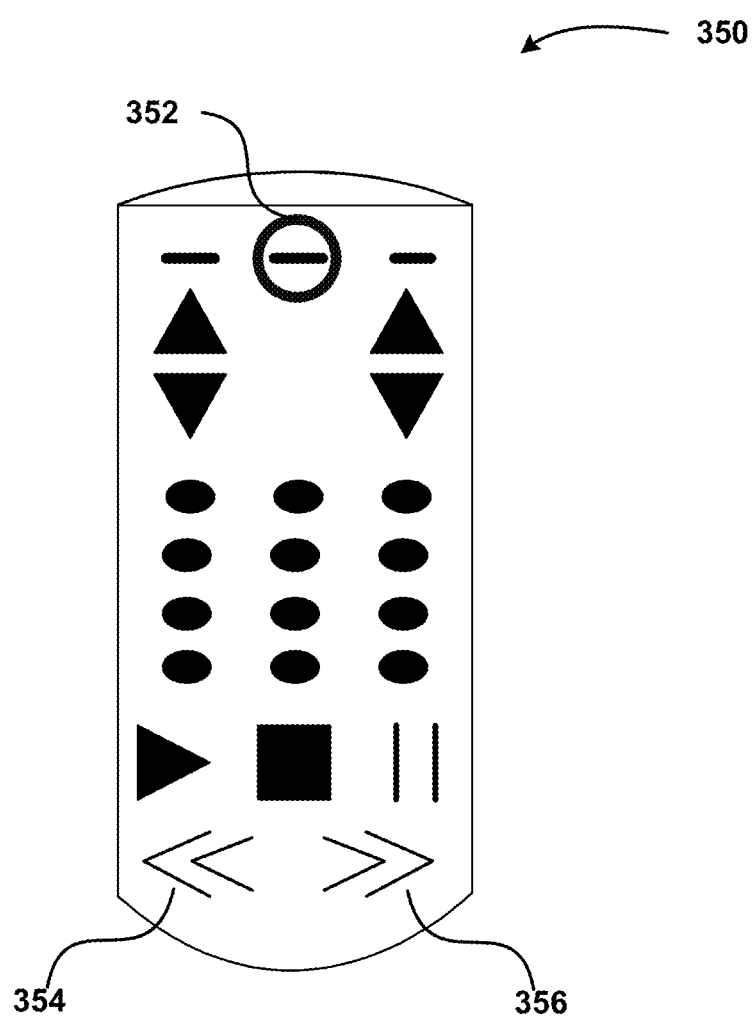
FIG. 3 shows an example input/output device according to some illustrative embodiments of the concepts and technologies described herein.

FIG. 3 shows an example input/output device such as the remote control 350 according to some illustrative embodiments of the concepts and technologies described herein. The remote control 350 can include a TV remote control, a remote control for a video recorder (e.g., a DVR), a remote control for the set-top box 102, or the like. The remote control 350 can be used to provide the functionality illustrated and described for the remote-control device 128 shown in FIG. 1, if desired.

The remote control 350 can be configured to receive inputs from a user, such as the user 129, and to provide corresponding input signals to a receiver or other interface of the set-top box 102 or other device. In some embodiments, the remote control 350 can provide input signals to the receiver via infrared control signals or via other communications media such as wireless, wired, or network communication media. As shown, the remote control 350 can include an option selection key 352, which may be a dedicated key to the functionality illustrated and described herein with reference to selecting an option, such as the option 231, provided by the alert 214 or selecting the alert 214 and/or which may be a multi-function key that also can provide other functionality illustrated and described herein. The remote control 350 also can include navigation keys 354 and 356, in some embodiments. It should be understood that soft keys, touch screens, and/or other inputs are contemplated and are possible.

Figure 4A:
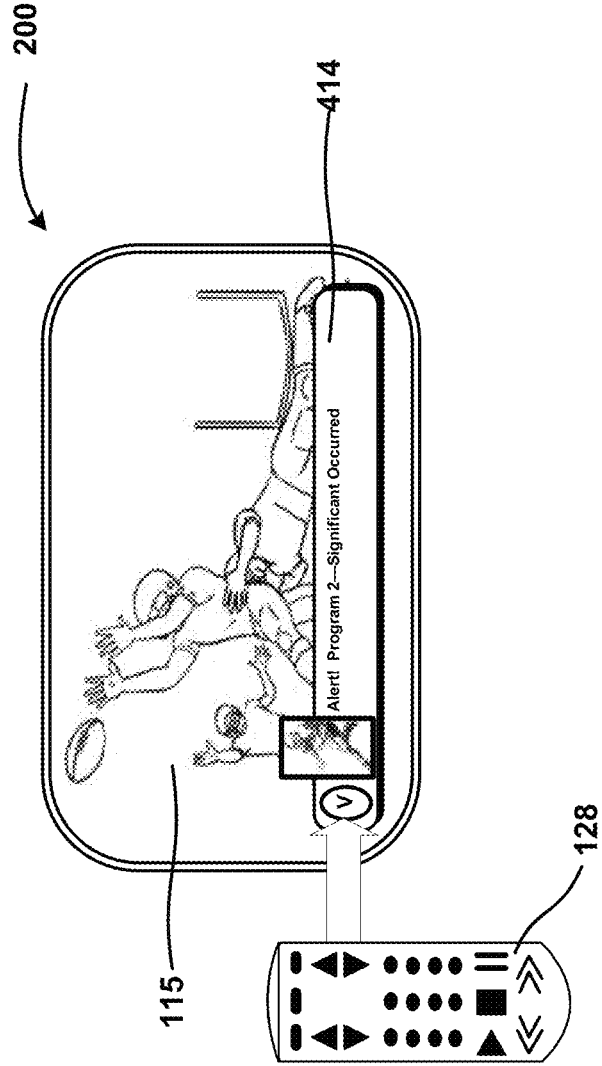
FIGS. 4A-4D show screen displays or portions thereof, according to some illustrative embodiments of the concepts and technologies described herein.
Figure 4B:
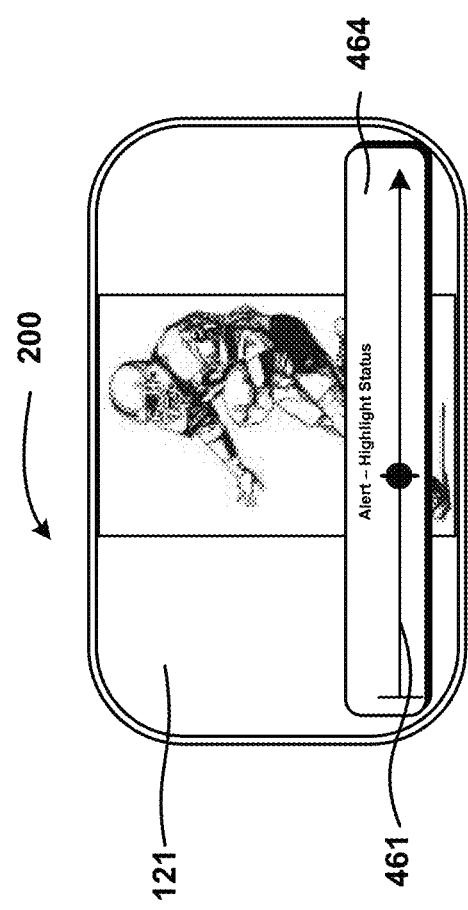

Referring now to FIGS. 4A and 4B, additional configurations and example functionality of alerts 414 and 464 and the highlight 121 are shown and described. The alerts 414 and 464 and the highlight 121 can also be displayed on the display 200 of the video device 103. The alerts 414 and 464 can include the same or similar aspects and features as the alert 214 shown in FIG. 2 but, as described further below regarding the alert 464, can provide different information. FIG. 4A shows the video content 115 displayed on the video device 103 for a first program, such as a football game, and also shows the alert 414 displayed on the video device 103 for another program (Program 2) that, according to some embodiments, is related to the football game being displayed on the video device 103. For instance, the other program (Program 2) may be another football game or other sporting event related to the football game being displayed on the video device 103. As shown, the user is being notified, via the alert 414, of a highlight event that has occurred in the other program (Program 2). Upon selection of the alert 414 or an option provided by the alert 414, the highlight application 108 can access a highlight 121 of the highlight event associated with the other program from the network 104 or from the set-top box 102, if the highlight 121 has already been provided to the set-top box 102. The highlight application 108 can provide the highlight 121 to the video device 103 for display to the user as shown in FIG. 4B to display the highlight 121 and, optionally, the alert 464. The alert 464 shown with the highlight 121 can include information such as a timeline 461 associated with the duration of the highlight 121 or other information associated with the highlight 121.

According to embodiments, the program shown in FIG. 4A is provided to the set-top box 102 as satellite or cable television signals received by a satellite or cable receiver 107, respectively, of the set-top box 102. The highlight shown in FIG. 4B, on the other hand, is provided to the set-top box 102 as IP data packets received by the network interface 109 of the set-top box 102 via the network 104. According to embodiments, as soon as playback of the highlight 121 has ended, the display 200 automatically returns to the video content 115 of the program that was being displayed prior to display of the highlight 121. In some embodiments, the video content 115 of the program continues to play while the highlight 121 is shown. In other embodiments, the video content 115 of the program is paused while the highlight 121 is being shown and resumes upon completion of playback of the highlight 121.

Figure 4C:
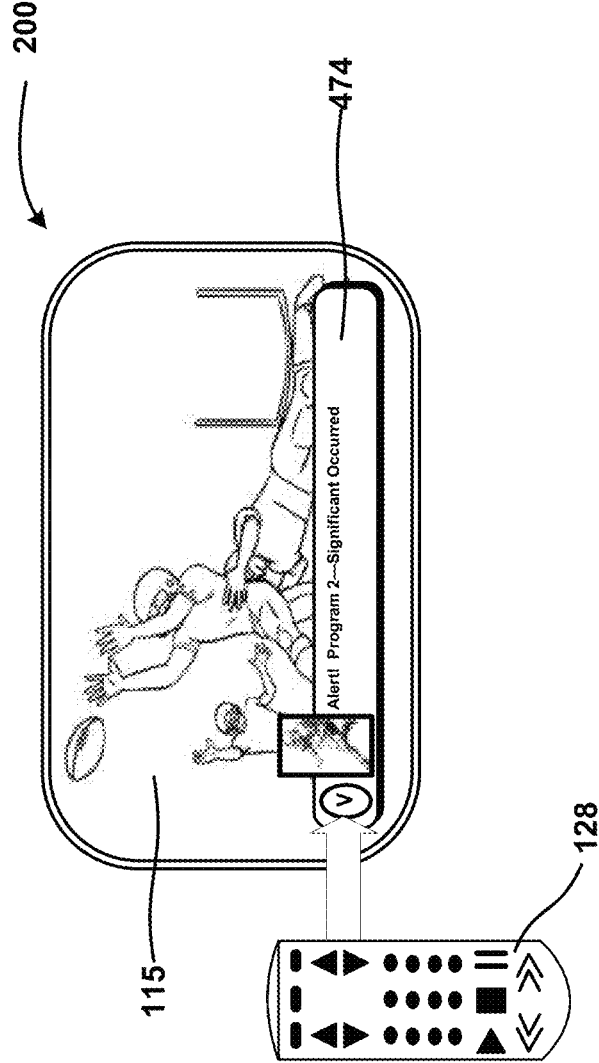
Figure 4D:
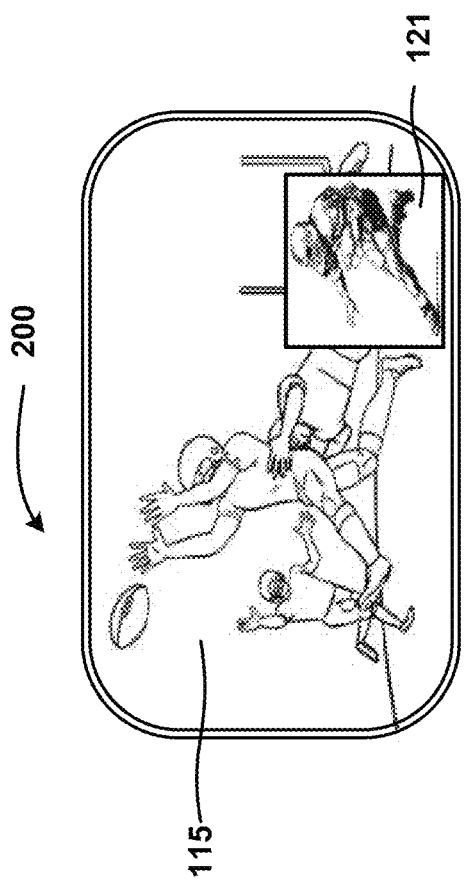

Referring now to FIGS. 4C and 4D, additional configurations and example functionality of an alert 474 and highlight 121 are shown and described along with operations performed by, for example, the highlight application 108. The alert 474 can also be displayed on the display 200 of the video device 103. The alert 474 can include the same or similar aspects and features as the alerts 214, 414 shown in FIGS. 2 and 4A, and the highlight 121 can include the same or similar aspects and features as the highlight 121 shown in FIG. 4B, but as described further below, can be provided in a different display mode and/or can differ. FIG. 4C shows the video content 115 displayed on the video device 103 for a first program, such as a football game, and also shows the alert 474 displayed on the video device 103 for another program (Program 2) that, according to some embodiments, is related to the football game being displayed on the video device 103. For instance, the other program (Program 2) can be another football game or other sporting event related to the football game being displayed on video device 103. As shown in FIG. 4C, the user is being notified, via the alert 474, of a highlight event that has occurred in the other program (Program 2). Upon selection of the alert 474 or an option provided by the alert 474, the highlight application 108 can access the highlight 121 and provide the highlight 121 to the video device 103 for display on the display 200 to the user as shown in FIG. 4D to display the viewable highlight 121.

According to embodiments, the program for the video content 115 shown in FIGS. 4C and 4D is provided to the set-top box 102 as satellite or cable television signals received by a satellite or cable receiver 107, respectively, of the set-top box 102. The highlight 121 shown in FIG. 4D, on the other hand, is provided to the set-top box 102 as IP data packets received by the network interface 109 of the set-top box 102 via the network 104. According to the embodiments shown in FIGS. 4C and 4D, the video content 115 of the program being viewed (Program 1), which is received via the satellite or cable receiver 107, continues to be shown while the highlight 121, which is received as IP data packets, is shown in the display 200 of video device 103 as a picture-in-picture display along with continued display of video content 115. In some embodiments, as soon as the highlight 121 has ended, the highlight 121 is automatically removed from the display 200, and the video content 115 continues being displayed, but without the alert 474 or the highlight 121 being shown.

Figure 5A:
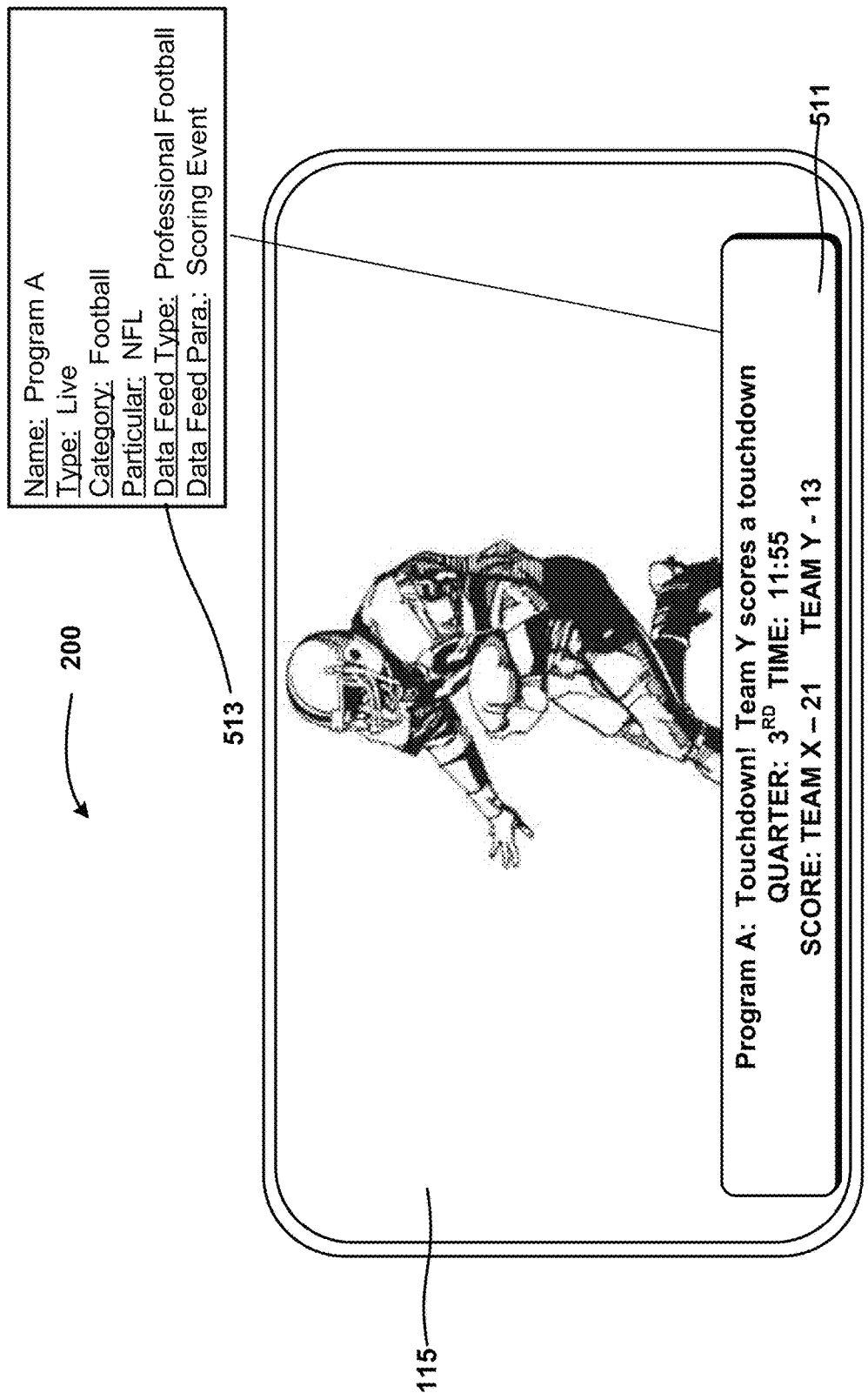
FIGS. 5A-5B show examples of data feed information related to an example program according to concepts and technologies described herein.
Figure 5B:
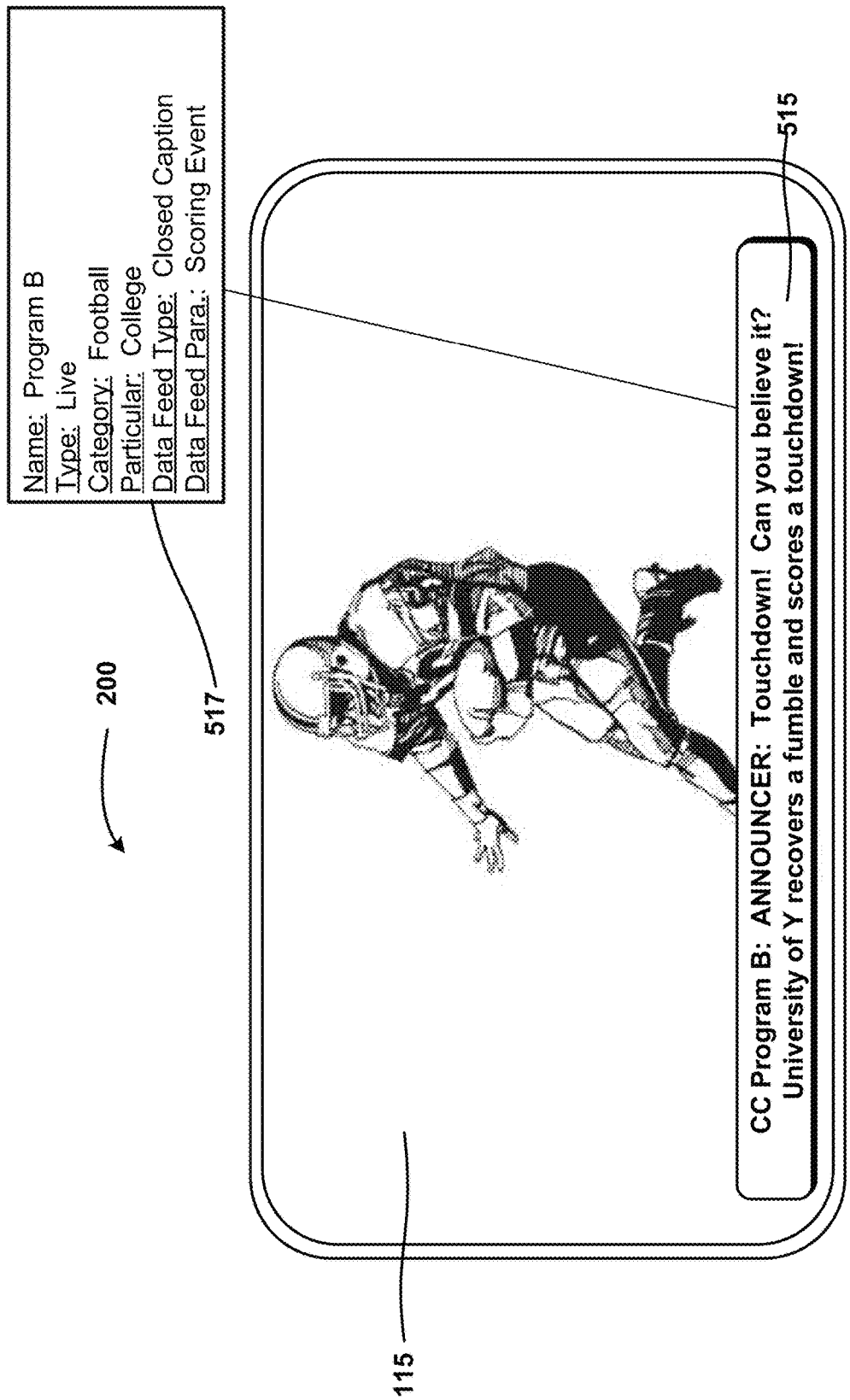

Referring now to FIGS. 5A and 5B, according to concepts and technologies discussed herein, FIGS. 5A and 5B provide example displays 200 that can be shown on the video device 103. The displays 200 shown in FIGS. 5A-5B are provided to illustrate data feeds from which information can be collected and evaluated by the content server 116 for providing highlight notifications 119 and highlights 121 to the set-top box 102. The displays of programs shown in FIGS. 5A and 5B are for illustration purposes with respect to data feeds 513 and 517, respectively, that can accompany programs provided by the content server 116 to the set-top box 102. It is understood that these programs do not need to be shown or provided to the set-top box 102 in order for the content server 116 to evaluate the respective data feeds 513 and 517. The displays of FIGS. 5A and 5B are merely provided to assist with the explanation of the data feeds 511 and 515 that can accompany broadcast television programs that can be viewed by a user if selected.

Data feeds 513, 517 for the programs can include additional or supplemental information for the program that accompanies the video content 115 of the program. In one embodiment, according to aspects and technologies discussed herein, a data feed 513, 517 that is associated with a program can include descriptive information for a live event shown in the program. In some embodiments, the descriptive information can have a pre-determined format, such as score and status information. The descriptive information can be updated for some programs (e.g., for a sporting event, news program, or the like). Pre-determined parameters can be set for these data feeds. The parameters can be used to determine highlight events for which highlights can be created, as will be explained in more detail below.

As an example, as illustrated for discussion purposes, the data feed 513 for the video content 115 of a program (Program A) can be evaluated by the content server 116. In the example illustrated in FIG. 5A, Program A can correspond to a NATIONAL FOOTBALL LEAGUE (NFL) football game program. It is understood that the program can be the same program being viewed by the user or another program not being viewed by the user. The data feed 513 can have a pre-determined format based on the details for the program type, category and other features. Also, on-screen information 511 can be shown in the video content 115 as part of the program provided to the video device 103 if selected for viewing. Further, parameters can be pre-determined for the data feed 513. For example, default pre-determined parameters can be set for different types of programs. As an example, sporting events can have default pre-determined parameters for events of interest to most viewers for almost all sporting events, such as scoring events. Further, the pre-determined parameters, such as default pre-determined parameters, can additionally be set according to the type of sporting event, such as scoring events of six points of more for football games and scoring events of a goal for hockey games. The parameters can also be set or customized for each program and/or for various groupings of programs, such as types of programs (e.g., sporting events and types of sporting events) or episodes of series of programs. The parameters can be used to identify highlight events for which to provide a highlight, such as a scoring event. For instance, the content server 116 can identify, based on the data feed 513, occurrence of any scoring event as a highlight event for which a highlight 121 should be created. In another example, the content server 116 can identify an occurrence of a scoring event that changes the score by six points or more as being a highlight event for which to create a highlight 121. It should be understood that these examples are illustrative, and therefore should not be construed as being limiting in any way.

In some embodiments, according to aspects and technologies discussed herein, pre-determined parameters can be set for the video content 115 by a content provider. In other embodiments, the pre-determined parameters can be set by an owner or operator of system shown in FIG. 1. In other embodiments, some, all or a combination of pre-determined parameters can be set by a user, such as the user 129, of the set-top box 102. For instance, the highlight application 108 can allow the user 129 to identify various programs, program types, and settings for determining highlight events for which to provide the highlights 121. In another example, the highlight application 108 can allow the user 129 to set preferences for the highlight notifications 119, such as particular programs, types of programs or particular content of programs that the user 129 would like to receive and/or not to receive alerts, such the alerts 214, 414, 464 and 474, associated with highlights of highlight events from those programs. In some embodiments, the highlight application 108 can notify the content server 116 and/or provide, to the content server 116, data that indicates the user preferences regarding the highlights. In some other embodiments, the highlight application 108 can perform operations based on the user's preferences, such as filtering the highlight notifications 119 to process and provide to the set-top box 102 of the user 129 only those that meet the user's preferences, or the like.

Continuing now with FIG. 5B, as an example, as illustrated for discussion purposes, the data feed 517 for the video content 115 of the program (Program B) can be evaluated by the content server 116, which in the present example of FIG. 5B is for a college football game program. It is understood that the program can be the same program being viewed by the user 129, or another program not being viewed by the user 129. The data feed 517 can have a general pre-determined format that is common for many different types of programs, such as closed-captioned data that is sent as a data feed 517 along with some programs. Also, on-screen information 515 based on the data feed 517 can be displayed during viewing of the video content 115. For example, the on-screen information 515 can be presented as part of the program when displayed on a video device 103 and/or according to user preferences for viewing closed caption information. Further, parameters can be pre-determined for the data feed 517 for identifying highlight events to highlight, such as a scoring event based on key words, phrases and numeric values in the data feed 517. For instance, as in the example illustrated in FIG. 5A, the content server 116 can identify, based on the data feed 517, occurrence of any scoring that changes the score by six points or more as being a highlight event for which to create a highlight 121. However, in the example of FIG. 5B, the content server 116 can detect occurrence of a highlight event based on monitoring or searching for key words and/or values in the data feed 517. For example, the content server 116 can search the data feed 517 for words, values, or the like that indicate a "score," "touchdown," "six points," or other data established as a parameter that may indicate such a highlight event. It should be understood that these examples are illustrative, and therefore should not be construed as being limiting in any way.

The content server 116 can collect information about the program being viewed (program 1) on the video device 103 connected to the set-top box 102 along with the video content 115 for the program being viewed. The content server 116 can also collect information about other programs, such as programs (e.g., Program A and Program B of FIGS. 5A and 5B) that are available on other channels. The content server 116 can collect the information about the other programs along with video content for each of these programs. The content server 116 can use the information collected about these programs along with parameters to assist with determining highlights 121 of highlight events from the other programs about which to notify the set-top box 102. Video content of the other programs from which highlights 121 are identified for providing during the program being viewed may or may not be related to the video content 115 of the program being viewed. For example, a user 129 viewing a sports program can be provided a highlight 121 from a musical awards show based on the musical awards show meeting parameters established by the content server 116 and/or preferences set forth by the user 129.

In other embodiments, the content server 116 can collect information and provide highlight notifications, such as the highlight notification 119, to the set-top box 102. In some embodiments, the highlight notifications 119 can be associated with highlight events for other programs that are similar or related to a program being viewed. The other programs can have category information and/or other related information that matches the program being received by the set-top box 102. In some embodiments, the highlight notifications 119 can be associated with highlight events for other programs that are unrelated to a program being viewed, or for which a relationship to a program being viewed has not been determined. In some embodiments, the highlight notifications 119 can be associated with highlight events for the same program being viewed that occurred earlier in the program. In yet other embodiments, the content server 116 can collect information and provide the highlight notifications 119 to the set-top box 102 that are associated with highlights of highlight events from programs that correspond to user preferences of a user, such as the user 129, associated with the set-top box 102. In response to receipt of a highlight notification, such as the highlight notification 119, indicating that a highlight, such as the highlight 121, is available for viewing, an alert 214, 414, 464 or 474 associated with the highlight 121 can be provided to the video device 103 as discussed above along with FIGS. 2 and 4A-4C. Upon user selection of the alert 214, 414, 464 or 474, the highlight 121 can be accessed and provided to the video device 103. The highlight 121 can be streamed to the set-top box 102 using a second signal in a second format, and the highlight 121 can be removed from the display 200 on the video device 103 upon completion of the highlight 121. According to embodiments, the highlight notification 119 indicating that the highlight 121 is available for viewing as well as the alert 214, 414, 464 or 474 can be provided in near real-time to when the highlight event for which the highlight 121 was generated occurred in the corresponding program. This allows the user 129 to access the highlight 121 of the highlight event with minimal delay from when the highlight event occurs in the corresponding program. It should be understood that this example is illustrative, and therefore should not be construed as being limiting in any way.

Figure 6:
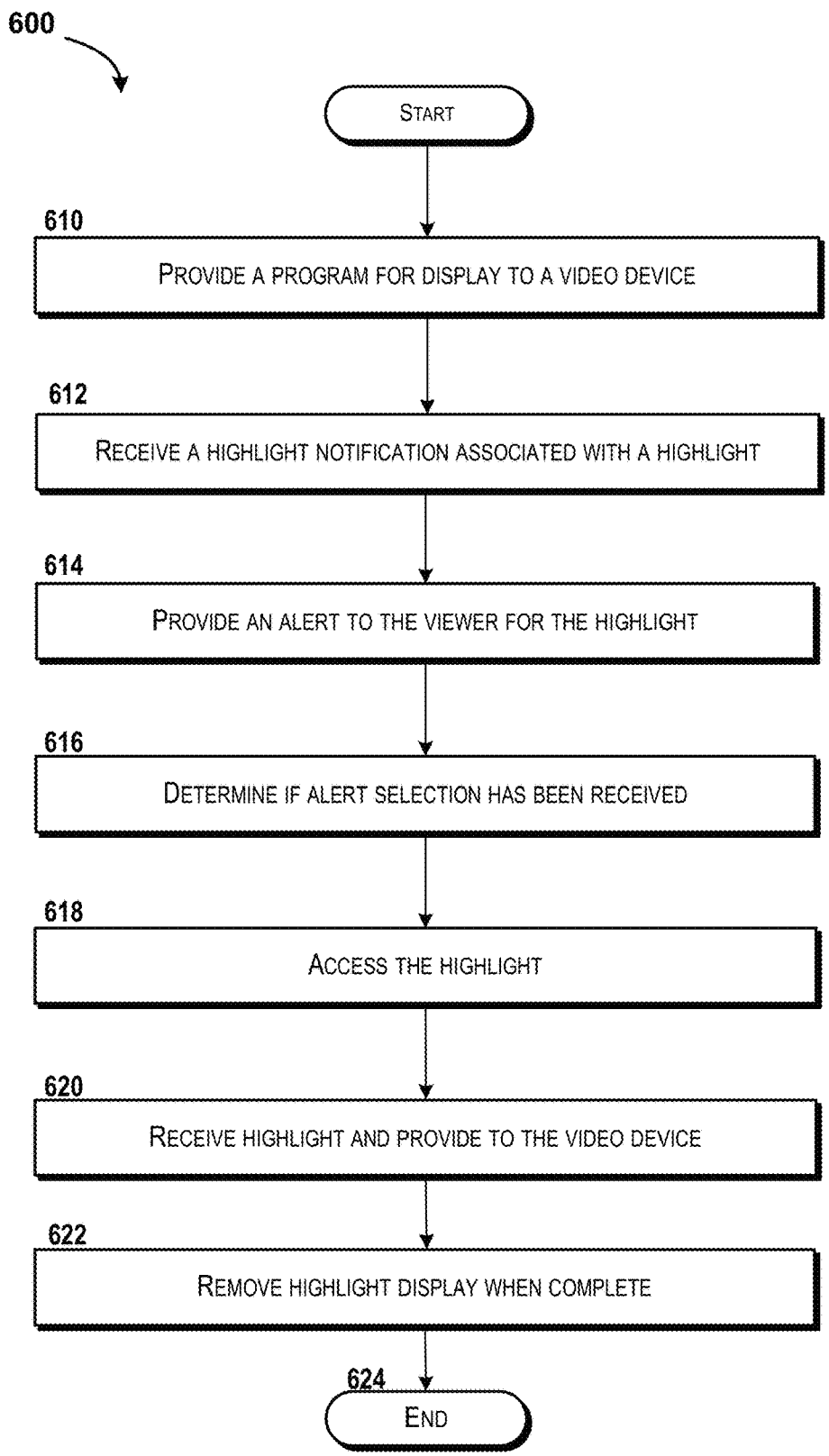
FIG. 6 is a method diagram that schematically illustrates a method for providing alerts for viewable highlights according to some illustrative embodiments of the concepts and technologies described herein.
Figure 7:
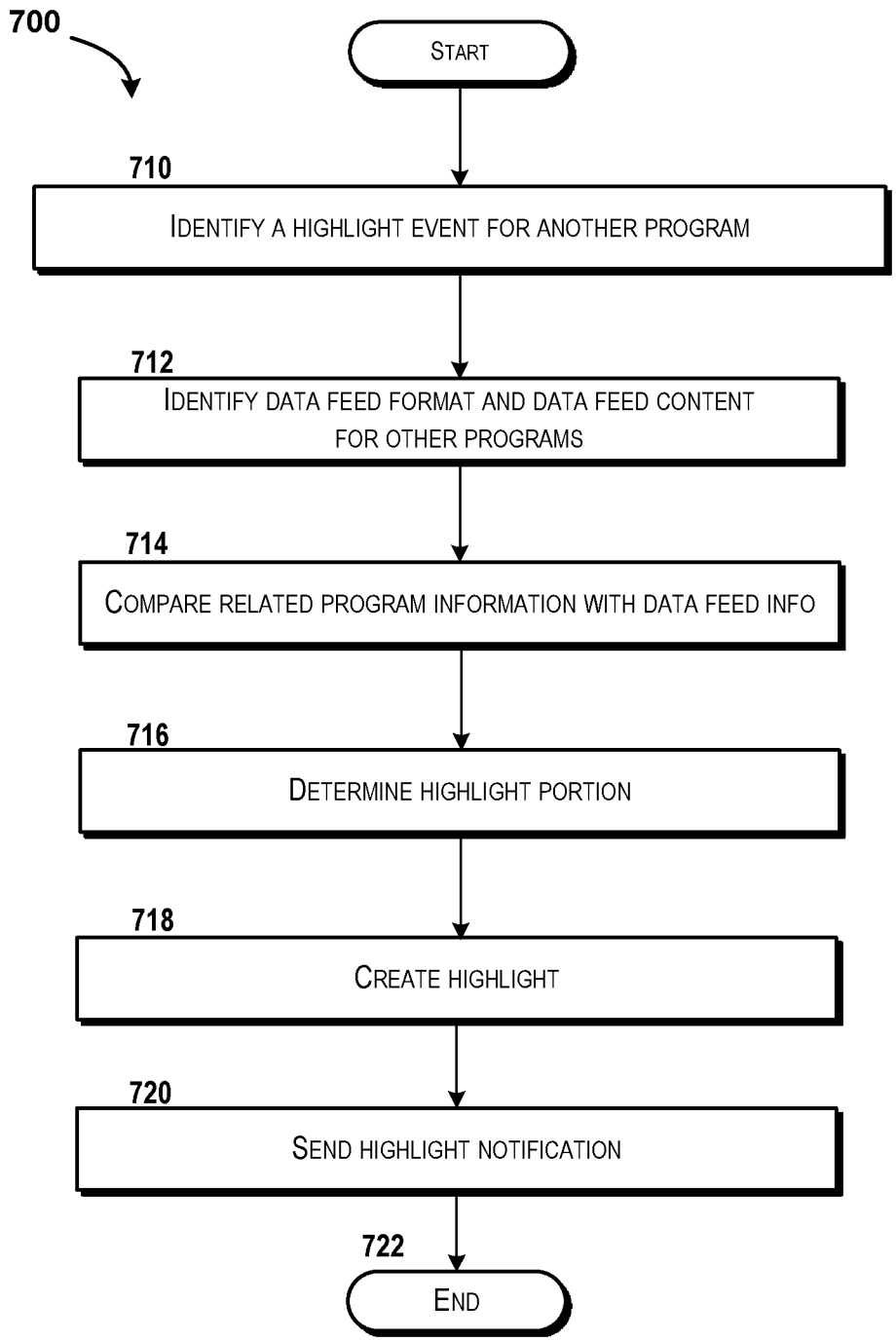
FIG. 7 is a method diagram that schematically illustrates a method for determining highlight events in programs according to some illustrative embodiments of the concepts and technologies described herein.

Turning now to FIGS. 6 and 7, aspects of methods 600 and 700 for providing alerts for viewable highlights will be described in detail, according to illustrative embodiments. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the set-top box 102 and/or other devices or systems to perform one or more operations and/or causing the processor to direct other components of the computing system or device to perform one or more of the operations.

Turning now to FIG. 6, aspects of a method 600 for providing alerts for viewable highlights of video content will be described in detail, according to an illustrative embodiment. For purposes of illustrating and describing the concepts of the present disclosure, the method 600 disclosed herein is described as being performed by the set-top box 102 via execution of one or more software modules such as, for example, the highlight application 108. It should be understood that additional and/or alternative devices and/or network nodes can provide the functionality described herein via execution of one or more modules, applications, and/or other software including, but not limited to, the highlight application 108. Thus, the illustrated embodiment is illustrative, and should not be viewed as being limiting in any way.

The method 600 begins at operation 610. At operation 610, the set-top box 102 can provide video content, such as the video content 115, of a program (program 1) to the video device 103 for display by the video device 103. The program can be provided to the set-top box 102 as satellite television signals or other television signals.

From operation 610, the method 600 can proceed to operation 612. At operation 612, the set-top box 102 receives from the content server 116 a highlight notification, such as the highlight notification 119, for an available highlight, such as the highlight 121, for viewing during the program being provided to the video device 103. The highlight notification 119 can include information about the highlight 121, such as information about the program from which the highlight 121 was generated, which can be, but is not required to be, related to the program being provided to the video device 103.

From operation 612, the method 600 proceeds to operation 614. At operation 614, the highlight application 108 provides an alert 214 to the video device 103 for display to the user, which alerts the user about the event in the other program and the viewable highlight 121 associated with the event. According to embodiments, the alert 214 provides an option for the user to select whether to watch the highlight 121.

From operation 614, the method 600 proceeds to operation 616. At operation 616, the highlight application 108 can determine whether a selection associated with the alert 214 has been received. In some embodiments, after a pre-determined period (e.g. 30 seconds) in which an alert selection has not been received, the alert 214 can be removed and the method can proceed to operation 624, wherein the method 600 can end.

If the alert selection has been received, such as within a pre-determined period, from operation 616, the method 600 proceeds to operation 618. At operation 618, the set-top box 102 accesses the highlight 121 to provide the highlight 121 to the video device 103. In some embodiments, the highlight application 108 can interact with the content server 116 to receive the highlight 121 as an Internet video clip. In other embodiments, the highlight application 108 can retrieve a stored copy of the highlight 121 already received by the set-top box 102 in order to provide the highlight 121 for display to the video device 103.

From operation 618, the method 600 proceeds to operation 620. At operation 620, the set-top box 102 receives the web content for the highlight 121, which the set-top box 102 provides to the video device 103 as discussed above along with FIGS. 4A and 4B. In some embodiments, the web content of the highlight 121 can be streamed web content received via network 104. In other embodiments, the web content of the highlight 121 can be stored web content already received via network 104.

From operation 620, the method 600 proceeds to operation 622. At operation 622, the highlight application 108 can remove the highlight 121 when playback of the highlight 121 is complete and can return display to the program being viewed prior to the highlight 121 being provided. In one embodiment, the program being viewed is not paused while the highlight 121 is provided. In another embodiment, the program can be paused and recorded while the highlight 121 is being shown, and the program can resume play at the same point thereafter. The method 600 then proceeds to operation 624, where the method 600 ends.

Turning now to FIG. 7, aspects of a method 700 for identifying a highlight event in another program will be described in detail, according to an illustrative embodiment. For purposes of illustrating and describing the concepts of the present disclosure, the method 700 disclosed herein is described as being performed by the content server 116 and provided to the set-top box 102 via execution of one or more software modules such as, for example, the content delivery application 114 of the content server 116 and/or the highlight application 108 of the set-top box 102. It should be understood that additional and/or alternative devices and/or network nodes can provide the functionality described herein via execution of one or more modules, applications, and/or other software including, but not limited to, the highlight application. For purposes of illustrating and describing the concepts of the present disclosure, the method 700 disclosed herein is described as being performed by the content server 116 via execution of one or more software modules. It should be understood that additional and/or alternative devices and/or network nodes can provide the functionality described herein via execution of one or more modules, applications, and/or other software including, but not limited to, the highlight application.

The method 700 begins at operation 710. At operation 710, the content server 116 can identify a highlight event for another program. For example, a highlight event can be determined as discussed above along with FIGS. 5A and 5B depending on the type of data feed 513, 517.

From operation 710, the method 700 can proceed to operation 712. Note that, as shown, operations 712-720 are sub-operations that can be part of operation 710 overall. At operation 712, the content server 116 identifies data feed formats and data feed content for other programs that are similar to the program being viewed and that can provide highlights of events therein while the program is being viewed. For example, in the football game scenario, the content server 116 can provide other football game programs that can provide highlight events and highlights while the program is being watched.

From operation 712, method 700 proceeds to operation 714. At operation 714, the content server 116 can compare related program information with the data feed data content to determine potential highlights. For example, in the scenario of a football game, periods, quarters, plays, etc., that exceed data feed data content parameters for typical game play can be evaluated more closely for potential highlights.

From operation 714 the method 700 proceeds to operation 716. At operation 716, the content server 116 can determine related program information and program content that meets or exceeds the parameters, and at operation 718, the content server 116 can thereby create the highlight.

From operation 718, the method 700 proceeds to operation 720. At operation 720, the content server 116 creates the highlight notification 119 and sends the highlight notification 119 to the set-top box 102. From operation 720, the method 700 proceeds to operation 722, where the method 700 ends.

Figure 8:
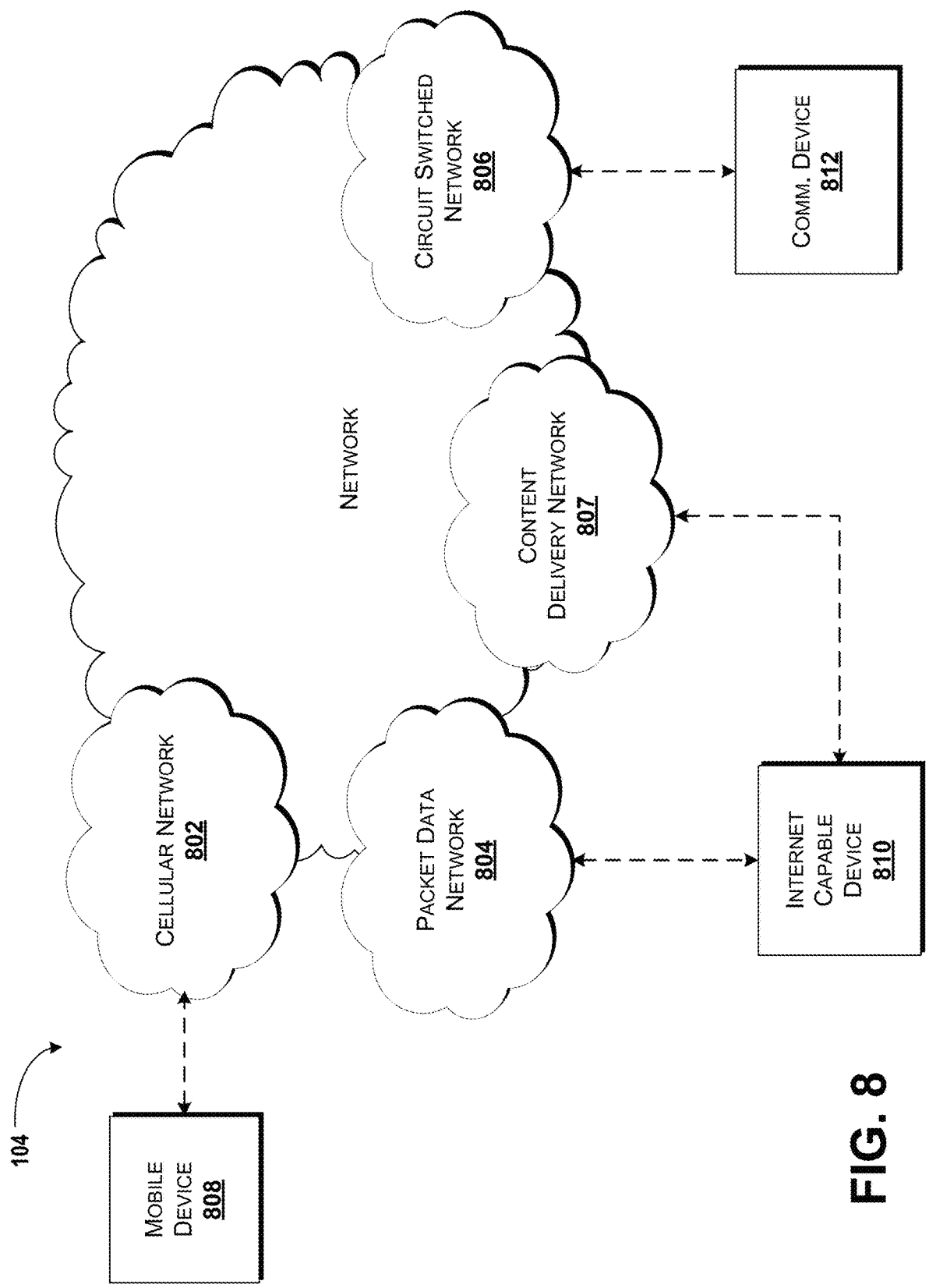
FIG. 8 schematically illustrates a network, according to an illustrative embodiment of the concepts and technologies described herein.

Turning now to FIG. 8, additional details of the network 104 are illustrated, according to an illustrative embodiment. The network 104 can include a cellular network 802, a packet data network 804, for example, the Internet, a circuit switched network 806, for example, a publicly switched telephone network ("PSTN"), and a content delivery network 807, for example a television delivery network, or the like, which can complement or traverse one or more of the cellular network 802, the packet data network 804, and/or the circuit switched network 806. The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system (POTS). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 104 is used to refer broadly to any combination of the networks 802, 804, 806, 807. It should be appreciated that substantially all of the functionality described with reference to the network 104 can be performed by the cellular network 802, the packet data network 804, the circuit switched network 806, and/or the content delivery network 807 alone or in combination with other networks, network elements, and the like.

Figure 9:
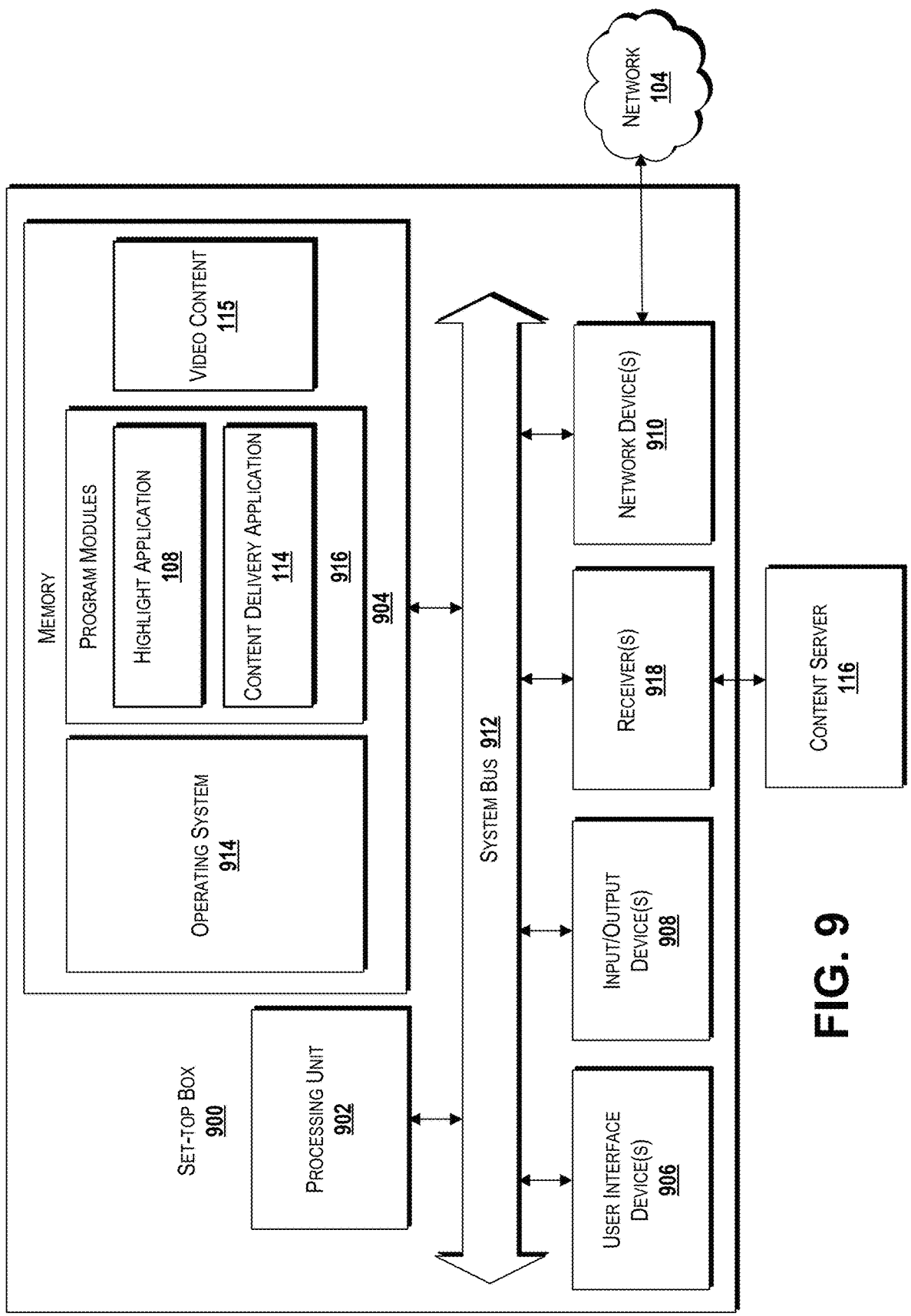
FIG. 9 is a block diagram illustrating an example computing device, according to some illustrative embodiments of the concepts and technologies described herein.

Referring now to FIG. 9, a block diagram is shown illustrating a set-top box 900 configured to provide the functionality described herein for generating and providing alerts and highlights, in accordance with various embodiments of the concepts and technologies disclosed herein. In some embodiments, the architecture shown in FIG. 9 can correspond to the devices illustrated and described herein with respect to the set-top box 102 and/or the content server 116, though this is not necessarily the case. The set-top box 900 includes a processing unit 902, a memory 904, one or more user interface devices 906, one or more input/output ("I/O") devices 908, one or more network devices 910, and one or more receivers 918, each of which is operatively connected to a system bus 912. The bus 912 enables bi-directional communication between the processing unit 902, the memory 904, the user interface devices 906, the I/O devices 908, the network devices 910, and the receivers 918.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916, which can include the highlight application 108 and/or content delivery application 114. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 916 may include various software and/or program modules described herein. In some embodiments, for example, the program modules 916 can include the highlight application 108 and/or the content delivery application 114. These and/or other programs can be embodied in computer-readable media containing instructions that, when executed by the processing unit 902, perform one or more of the methods 600 and 700 described in detail above with respect to FIGS. 6 and 7. According to embodiments, the program modules 916 may be embodied in hardware, software, firmware, or any combination thereof. Although not shown in FIG. 9, it should be understood that the memory 904 also can be configured to store user interface data, the video content 115, preferences and/or settings for flagging programs, and/or other data, if desired.

By way of example, and not limitation, computer-readable media may include any available computer storage media or communication media that can be accessed by the set-top box 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the set-top box 900. In the claims, the phrase "computer storage medium" and variations thereof does not include waves or signals per se and/or communication media.

The user interface devices 906 may include one or more devices with which a user accesses the set-top box 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer. The receivers 918 may include a satellite receiver for receiving satellite television signals and information associated with the satellite television signals, a cable receiver for receiving cable television signals and information associated with the cable television signals, and/or a terrestrial receiver for receiving digital broadcast television signals and information associated with the digital broadcast television signals.

The network devices 910, such as the network interface 109, enable the set-top box 900 to communicate with other networks or remote systems via a network, such as the network 104. Examples of the network devices 910 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing alerts to a user viewing a program for highlights available to be viewed, providing the highlights when selected by a user to be viewed, determining highlight events, preparing the highlights and providing highlight notifications associated with the highlights have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A set-top box comprising:
a processor; and
a memory that stores computer-executable instructions that, when executed by the processor, cause the processor to perform operations comprising:
receiving a first program via a first signal in a first format, providing, to a video device, the first program for display by the video device, wherein the first program is displayed by the video device, receiving, from a content server, a highlight notification for a highlight available to be provided for viewing while the first program is being provided to the video device, wherein the highlight comprises a portion of a second program identified by the content server as a highlight event, wherein the second program is different from the first program being displayed by the video device, wherein the portion of the second program is identified by the content server as a highlight event based at least in part on the portion of the second program at least meeting a parameter, and wherein the parameter comprises a point value of a scoring event that occurs during the portion of the second program such that the portion of the second program is identified by the content server as a highlight event when the scoring event that occurs during the portion of the second program is associated with a score that at least meets the point value;

in response to receiving the highlight notification,
creating an alert that is displayable by the video device, and
providing, to the video device while the video device is displaying the first program, the alert for display by the video device, wherein the alert is associated with the highlight available for viewing, and wherein the alert is displayed by the video device while the first program is also displayed by the video device, receiving an indication that the alert has been selected, and in response to receiving the indication that the alert has been selected,
receiving the highlight via a second signal in a second format, wherein the highlight is streamed to the set-top box, and
providing, to the video device, the highlight for display by the video device, wherein the highlight is removed from display on the video device upon completion of the highlight.

2. The set-top box of claim 1, wherein the first program in the first format continues to be provided to the set-top box using the first signal while the highlight is streamed to the set-top box using the second signal.

3. The set-top box of claim 2, wherein the first program in the first format provided to the set-top box using the first signal is recorded while the highlight is streamed to the set-top box using the second signal in the second format.

4. The set-top box of claim 3, wherein the first program provided to the video device is paused while the highlight is provided to the video device.

5. The set-top box of claim 1, wherein the first program provided to the set-top box using the first signal in the first format comprises a broadcast program provided using a satellite feed or a cable feed in a broadcast format, and the highlight streamed to the set-top box using the second signal in the second format comprises a video clip streamed as web content in an Internet video format.

6. The set-top box of claim 1, wherein the portion of the second program is identified by the content server as a highlight event based at least in part on program information associated with the second program at least meeting the parameter.

7. The set-top box of claim 1, wherein the highlight notification comprises a program name associated with the second program from which the highlight was generated and an alert description associated with the highlight.

8. A method comprising:
receiving, at a set-top box, a first program via a first signal in a first format;
providing, from the set-top box, to a video device, the first program for display by the video device, wherein the first program is displayed by the video device;
receiving, by the set-top box, from a content server, a highlight notification for a highlight available to be provided for viewing while the first program is being provided to the video device, wherein the highlight comprises a portion of a second program identified by the content server as a highlight event, wherein the second program is different from the first program being displayed by the video device, wherein the portion of the second program is identified by the content server as a highlight event based at least in part on the portion of the second program at least meeting a parameter, and wherein the parameter comprises a point value of a scoring event that occurs during the portion of the second program such that the portion of the second program is identified by the content server as a highlight event when the scoring event that occurs during the portion of the second program is associated with a score that at least meets the point value;

in response to receiving the highlight notification,
creating an alert that is displayable by the video device, and
providing, by the set-top box, to the video device while the video device is displaying the first program, the alert for display by the video device, wherein the alert is associated with the highlight available for viewing;

receiving, by the set-top box, an indication that the alert has been selected; and in response to receiving the indication that the alert has been selected,
receiving, by the set-top box, the highlight via a second signal in a second format, wherein the highlight is streamed to the set-top box, and
providing, by the set-top box, to the video device, the highlight for display by the video device, wherein the highlight is removed from display on the video device upon completion of the highlight.

9. The method of claim 8, wherein the first program in the first format continues to be provided to the set-top box using the first signal while the highlight is streamed to the set-top box using the second signal.

10. The method of claim 9, wherein the first program in the first format provided to the set-top box using the first signal is recorded while the highlight is streamed to the set-top box using the second signal in the second format.

11. The method of claim 10, wherein the first program provided to the video device is paused while the highlight is provided to the video device.

12. The method of claim 8, wherein the first program provided to the set-top box using the first signal in the first format comprises a broadcast program using a satellite feed or a cable feed in a broadcast format, and the highlight streamed to the set-top box using the second signal in the second format comprises a video clip streamed as web content in an Internet video format.

13. The method of claim 8, wherein the portion of the second program is identified by the content server as a highlight event based at least in part on program information associated with the second program at least meeting the parameter.

14. The method of claim 8, wherein the highlight notification comprises a program name associated with the second program from which the highlight was generated and an alert description associated with the highlight.

15. A computer storage medium having computer-executable instructions stored thereon that, when executed by a processor of a set-top box, cause the processor to perform operations comprising:
receiving a first program via a first signal in a first format;
providing, to a video device, the first program for display by the video device, wherein the first program is displayed by the video device;
receiving, from a content server, a highlight notification for a highlight available to be provided for viewing while the first program is being provided to the video device, wherein the highlight comprises a portion of a second program identified by the content server as a highlight event, wherein the second program is different from the first program being displayed by the video device, wherein the portion of the second program is identified by the content server as a highlight event based at least in part on the portion of the second program at least meeting a parameter, and wherein the parameter comprises a point value of a scoring event that occurs during the portion of the second program such that the portion of the second program is identified by the content server as a highlight event when the scoring event that occurs during the portion of the second program is associated with a score that at least meets the point value;
in response to receiving the highlight notification,
creating an alert that is displayable by the video device, and
providing, to the video device while the video device is displaying the first program, the alert for display by the video device, wherein the alert is associated with the highlight available for viewing, and wherein the alert is displayed by the video device while the first program is also displayed by the video device;
receiving an indication that the alert has been selected; and
in response to receiving the indication that the alert has been selected,
receiving the highlight via a second signal in a second format, wherein the highlight is streamed to the set-top box, and
providing, to the video device, the highlight for display by the video device, wherein the highlight is removed from display on the video device upon completion of the highlight.

16. The computer storage medium of claim 15, wherein the first program in the first format continues to be provided to the set-top box using the first signal while the highlight is streamed to the set-top box using the second signal.

17. The computer storage medium of claim 16, wherein the first program in the first format provided to the set-top box using the first signal is recorded while the highlight is streamed to the set-top box using the second signal in the second format.

18. The computer storage medium of claim 17, wherein the first program provided to the video device is paused while the highlight is provided to the video device.

19. The computer storage medium of claim 15, wherein the first program provided to the set-top box using the first signal in the first format comprises a broadcast program using a satellite feed or a cable feed in a broadcast format, and the highlight streamed to the set-top box using the second signal in the second format comprises a video clip streamed as web content in an Internet video format.

20. The computer storage medium of claim 15, wherein the portion of the second program is identified by the content server as a highlight event based at least in part on program information associated with the second program at least meeting the parameter.

\* \* \* \* \*